(12) United States Patent
Savry

(10) Patent No.: US 8,249,502 B2
(45) Date of Patent: Aug. 21, 2012

(54) RADIO-FREQUENCY COMMUNICATION DEVICE, SYSTEM AND METHOD

(75) Inventor: Olivier Savry, Sassenage (FR)

(73) Assignee: Commissariat à l'Energie Atomique, Paris (FR)

(*) Notice: Subject to any disclaimer, the term of this patent is extended or adjusted under 35 U.S.C. 154(b) by 351 days.

(21) Appl. No.: 12/428,863

(22) Filed: Apr. 23, 2009

(65) Prior Publication Data

US 2009/0291635 A1    Nov. 26, 2009

(30) Foreign Application Priority Data

May 26, 2008 (FR) ...................................... 08 53410

(51) Int. Cl.
*H04B 5/00* (2006.01)

(52) U.S. Cl. ........................................ 455/41.1; 455/73

(58) Field of Classification Search ................. 455/41.4, 455/73, 41.1
See application file for complete search history.

(56) References Cited

U.S. PATENT DOCUMENTS

| | | | |
|---|---|---|---|
| 2005/0233772 A1* | 10/2005 | McDonnell | .................. 455/566 |
| 2007/0246546 A1 | 10/2007 | Yoshida | |
| 2008/0272889 A1 | 11/2008 | Symons | |

FOREIGN PATENT DOCUMENTS

GB    2422517    4/2008

OTHER PUBLICATIONS

Republic of France Preliminary International Search Report dated Jan. 22, 2009 (2 pgs.).

* cited by examiner

*Primary Examiner* — Lincoln Donovan
*Assistant Examiner* — Shikha Goyal

(57) ABSTRACT

The invention relates to a radio-frequency communication device comprising an inductive antenna in order to communicate with a transponder. According to the invention, the antenna is capable of establishing weak coupling with a transmitter which produces a magnetic field which is substantially homogeneous on the scale of the antenna and is also capable of establishing strong inductive coupling with a transponder located in the vicinity of the device, with the device comprising a transponder interrogation circuit comprising means of sampling and processing the signal on the antenna terminals which are capable of producing a reference signal as a function of said signal; modulation means capable of modulating the reference signal; and application means capable of applying the modulated signal to the antenna terminals.

18 Claims, 3 Drawing Sheets

RADIO-FREQUENCY COMMUNICATION DEVICE, SYSTEM AND METHOD

CROSS REFERENCE TO RELATED APPLICATIONS

This application claims priority under 35 U.S.C. §119 from French Patent Application No. 08 53410 filed on May 26, 2008 in the French Patent Office, the entire disclosure of which is incorporated herein by reference.

FIELD OF THE INVENTION

The invention relates to the field of radio-frequency contactless communication and, more especially, radio-frequency communication by inductive coupling.

BACKGROUND OF THE INVENTION

A contactless communication device such as that defined by Standards ISO 14443, ISO 1593 or ISO 18000-X, for example, usually comprises an inductive antenna formed by an electrical conductor which forms one or more loops and is connected to an integrated circuit which causes the voltage and/or load across the terminals of the antenna to vary in order to generate an amplitude-modulated or phase-modulated magnetic field. Communication can thus be established with another device of this type located within the communication range of the first device because of the electromotive force produced between the antennas.

Integrating contactless communication technology in a mobile device such as, for instance, a mobile phone, a smart phone or a digital personal assistant, makes it possible to use the device for other purposes, e.g. as a "contactless card" (payment, computer ticketing, couponing, access control, etc.) or "contactless card reader" (reading information contained in RFID labels located in the street, on merchandise or elsewhere).

However, contactless reading usually requires a minimum of 2 W in order to communicate in the 13.56 MHz frequency band using contactless cards which comply with Standard ISO 14443 or Standard ISO 15693 or RFID labels which meet Standard ISO 18000-X.

The power required therefore makes integrating such a function in a mobile device problematic. In fact, implementation entails a reduction in the battery life of the mobile device or involves oversizing the device's energy source in order to compensate for the excess power consumption associated with the contactless reader function.

SUMMARY OF THE INVENTION

The object of the present invention is to propose a mobile device having a built-in contactless read function while mastering the problem of excess power consumption associated with such a function.

To achieve this, the object of the invention is a radio-frequency communication device comprising an inductive antenna.

According to the invention, the antenna is capable of establishing weak coupling with a transmitter which produces a magnetic field which is substantially homogeneous on the scale of the antenna and is also capable of establishing strong inductive coupling with a transponder located in the vicinity of the device, with the device comprising a transponder interrogation circuit comprising means of sampling and processing the signal on the antenna terminals which are capable of producing a reference signal as a function of said signal; modulation means capable of modulating the reference signal; and application means capable of applying the modulated signal to the antenna terminals.

In other words, the idea is to use an external energy source to power the contactless read function and, more especially, to power operations when the card is interrogated by the device according to the invention.

It is known that a contactless card does not comprise an internal energy source. To obtain energy, the card usually comprises a rectifier which is connected to its antenna and an averaging filter. Thus, when the card is immersed in a magnetic field such as that of a contactless reader, for example, a voltage is produced across the terminals of the card's antenna and this voltage is then rectified and subsequently filtered in order to supply power to the various electronic circuits on the card. The card is therefore remotely powered by the external energy source which represents the magnetic field produced by the contactless reader.

It is therefore possible to envisage using the same principle in order to remotely power the circuits which form the built-in contactless reader in a mobile device. For example, in some stores there are already many contactless readers which are used to read RFID labels, thus enabling shoppers to find out the price of items which have such labels. Shoppers could read these labels and also benefit from sales promotion offers contained in a contactless card located in the vicinity of a reader by using their mobile phones equipped with a contactless reader function.

However, when conventional reader components are incorporated in a mobile device, it is difficult to remotely power them from another conventional contactless reader and to communicate with a contactless card. In fact, the field of the contactless reader used as an external energy source is superimposed on the magnetic field produced in order to communicate with the card. Because of this, the reader's magnetic field interferes with the magnetic field of the contactless card.

It is known that the magnetic field produced by the reader is substantially homogeneous outside the immediate vicinity of its antenna, given the latter's large size.

By designing a mobile device which is in conformity with the device according to the invention, the signal component on the terminals of its antenna is reduced or even zero relative to the field of the reader. When the mobile device is placed in the vicinity of a contactless card, the device therefore hardly sees the magnetic field of the reader or substantially does not see it at all and the device is not directly subjected to interference from the reader.

Placing the mobile device alongside the contactless card produces strong inductive coupling between them. Because the card is also immersed in the reader's field, the field of the reader produces an electromotive force in the card's antenna. This force in turn produces an electromotive force in the antenna of the device because it is strongly coupled to the card.

Conversely, by imposing a possibly modulated reference signal on the terminals of the antenna of the mobile device, it is also possible to apply a substantially proportional signal to the antenna of the card through inductive coupling. This way one creates, at the level of the card, the equivalent of a local magnetic field which is capable of eliminating any modulation of the magnetic field which is produced by the reader.

The mobile device according to the invention is thus capable of outputting commands using little energy with the energy used to operate the contactless read function of the mobile device being obtained essentially from the field of the reader, via the card. In fact, the mobile device samples the signal on the antenna terminals, produces and modulates a reference signal as a function of the signal which is essentially sampled by using passive components and injects the modulated signal back into the antenna. This feedback loop does not involve using any power component to amplify and emit a magnetic field. The only excess consumption involved is that required in order to switch components and for the logic circuitry needed in order to decode messages from the card or in order to encode the commands that are to be transmitted. This excess consumption is much less than that involved in the emission of a magnetic field by a conventional contactless reader which requires a large current.

It should also be noted that a mobile device according to the invention does not prevent the reader from communicating with other contactless cards.

In one particular embodiment, the antenna comprises a first winding and a second winding which are connected in series and wound in opposite directions.

In other words, the fact that the two antenna windings are connected in series and are wound in opposite directions means that the electromotive forces induced therein by the reader are subtracted or even cancel each other out if the surface areas of the two windings are equal.

In one particular embodiment of the invention, the surface area of the second winding is substantially equal to the surface area of the first winding. More especially, the second winding comprises a plurality of loops, the surface area of each of which is a submultiple of the surface area of the first winding.

In other words, the electromotive forces induced in the device's antenna by a homogenous field cancel each other out. Furthermore, the first winding forms a large surface area which essentially sees the field of a contactless card whereas the second winding essentially sees the field of the reader. Also, using several small surface-area loops which are preferably centered and contained within the first winding reduces subtraction of the signal component relating to the card while still cancelling the field of the reader because of its homogeneity.

In one particular embodiment, the sampling and processing means comprise means of rectifying and averaging the signal on the antenna terminals. More especially, the rectifying and averaging means comprise a rectifier connected to the antenna terminals, an envelope detector connected to the output of the rectifier and an averager circuit connected to the output of the envelope detector.

In other words, because the field seen by the antenna is usually a modulated carrier, a reference is obtained in this way and is used as the basis for modulation when sending a command to the card.

Advantageously, the sampling and processing means comprise a first multiplier, which multiplies by a first predetermined gain of less than 1, connected to the output of the rectifying and averaging means. This way, the reference signal obtained is less than the low level of the modulation of the carrier received on the antenna and this prevents gaps in the reference signal and ensures reduced sensitivity to interference.

Advantageously, the modulation means comprise a second multiplier, which multiplies by a second predetermined gain, connected to the output of the sampling and processing circuit with a first controllable switch being located between the sampling and processing means and the antenna and a second controllable switch being located between the second multiplier and the antenna.

In other words the output signal of the sampling and processing circuit forms the high modulation level and the output signal of the second multiplier forms the low modulation level. Opening and closing the first switch and the second switch makes it possible to select either of these levels for modulation purposes. A device of this type is especially suitable for communicating with a type B card and a type B reader according to ISO Standard 14443.

Alternatively, the modulation means comprise a first controllable switch located between the sampling and processing means and the antenna and a capacitor capable of being connected in parallel with the antenna via a controllable switch.

In other words, the output signal of the sampling and processing circuit forms the high modulation level and the low modulation level is obtained by connecting the capacitor to the antenna terminals, which detunes the antenna. A device of this type is especially suitable for communicating with a type A card and a type B reader according to ISO Standard 14443.

In one particular embodiment of the invention, the sampling and processing means comprise filling means capable of producing a signal to fill gaps in the signal sampled on the antenna terminals. More especially, the filling means comprise an oscillator which is connected to the antenna and capable of generating a sine-wave signal having a frequency substantially equal to that of a carrier received on the antenna and synchronized with the latter, a first multiplier, which multiplies by a variable gain, being connected to the output of the oscillator and a circuit for controlling the gain of the multiplier capable of adjusting this gain to a value which is not zero when there is a gap in the signal sampled on the antenna terminals.

In other words, the device according to the invention is capable of generating a signal when there is no signal on the antenna terminals, as may be the case, for instance, if the reader is a type A reader according to Standard 14443 which uses a 100% modulation index. This way, communication of the device according to the invention is not disrupted by momentary absences of a signal on the antenna terminals.

Advantageously, the control circuit comprises a rectifier connected to the antenna, an envelope detector connected to the output of the rectifier, an averager circuit connected to the output of the rectifier and a subtracter, the non-inverting input of which is connected to the output of the detector, the inverting output of which is connected to the output of the averager circuit, the output of which is connected to the multiplier in order to control the latter's gain.

Gaps in the signal on the antenna terminals are detected automatically this way.

Advantageously, the modulation means are capable of modulating the gap filling signal and the application means are capable of applying the sum of the signal sampled on the antenna terminals and the modulated filling signal to the antenna terminals.

A modulated signal for communicating with a type A card, even though the reader is a type A reader, is obtained simply this way.

The object of the invention is also a radio-frequency communication system comprising a radio-frequency emission source using a carrier, a transponder and a device of the above-mentioned type.

The object of the invention is also a method for sending a command from a radio-frequency communication device designed to communicate with a transponder, said device being of the above-mentioned type and the method consisting of: placing the transponder and the device in a radio-frequency magnetic field which is substantially homogeneous on the scale of the device's antenna; placing the device close to the transponder so as to establish strong inductive coupling between the device and the transponder; and activating the sampling and processing means, modulation means and application means of the device when the device sends a command to the transponder.

BRIEF DESCRIPTION OF THE DRAWINGS

The invention will be made more readily understandable by the following description which is given merely by way of example and relates to the accompanying drawings in which.

DETAIL DESCRIPTION OF THE INVENTION

Figures 1, 2:
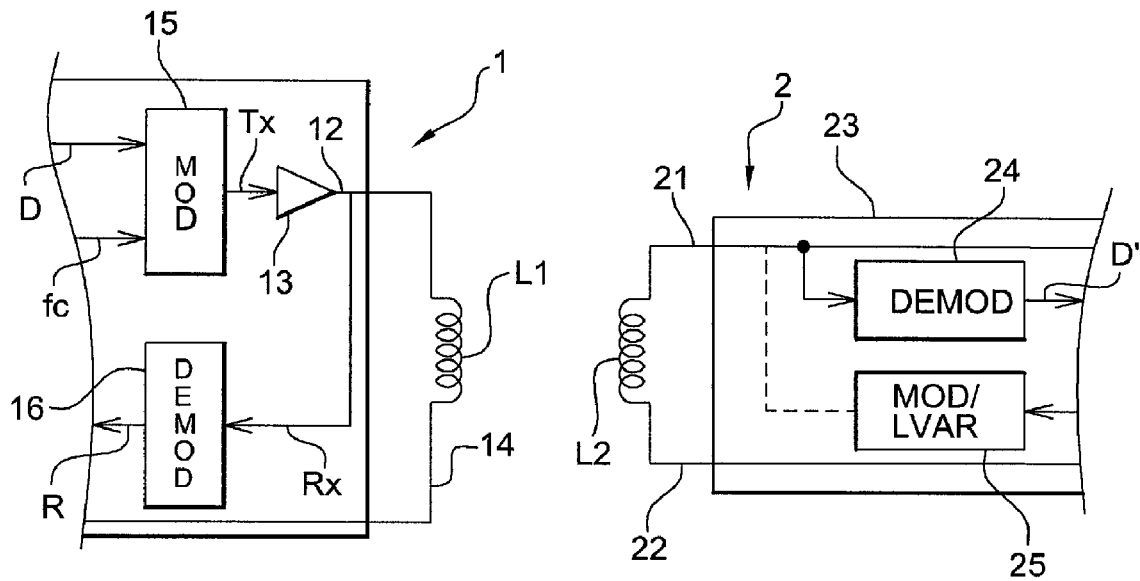
FIG. 1 is a partial schematic view of a contactless reader according to the prior art.
FIG. 2 is a partial schematic view of a transponder according to the prior art.

FIGS. 1 and 2 are partial schematic views of examples of a contactless reader 1 and transponder 2 according to the state of the art, such as a contactless card, for example.

In FIG. 1, reader 1 has an oscillating circuit based on antenna L1 connected to an output terminal 12 of an amplifier or antenna coupler 13 and to a terminal 14 which is at a reference potential such as ground.

Amplifier 13 receives the signal to be transmitted Tx which is provided by a modulator 15. Modulator 15 mainly receives a data signal D which is to be transmitted and a carrier frequency fc. Signal Tx is transmitted regardless whether or not there is data D to be transmitted insofar as the field generated on the basis of signal Tx is used as an energy source for transponder 2 (FIG. 2). The data D to be transmitted usually originates from a digital module such as a microprocessor for example (not shown).

Reader 1 also comprises a demodulator 16 which is used to detect any data received from transponder 2. For example, demodulator 16 receives the voltage sampled on the antenna L1 terminals (signal Rx) and the demodulator supplies a received data signal R.

In FIG. 2, transponder 2 comprises an oscillating circuit which has an antenna L2 designed to pick up the field generated by the oscillating circuit of reader 1. In this example, terminals 21, 22 of antenna L2 are connected to a signal-analysis integrated circuit 23. Circuit 23 comprises, in particular, a demodulator 24 which is used to demodulate the signals transmitted by the terminal. The signals obtained from demodulator 24 constitute the data signals D' received from reader 1 and are fed to a processing module (not shown) of circuit 23 which includes, for instance, a microcontroller or a hardwired logic circuitry, the operating clock of which is extracted from the signal on the terminals of the oscillating circuit.

In order to send data to reader 1, transponder 2 comprises a variable-impedance element 25 capable of modifying the load formed by its own electronic circuits on its oscillating circuit.

When transponder 2 is located in the field of reader 1, a high-frequency voltage is generated across the terminals of its oscillating circuit. This voltage, having been rectified and filtered by circuit 23, provides a power supply voltage for the various electronic circuits of transponder 2.

In the transponder 2 to reader 1 communication direction, modulation of the data to be transmitted is generally referred to as "retromodulation" and is performed at a frequency which is lower than frequency fc which is used to excite the oscillating circuit of reader 1. For example, a contactless card receives commands by modulating a carrier having a frequency of 13.56 MHz in case of Standards ISO 1443 and ISO 15693 and replies by retromodulating a subcarrier having a frequency of 847.5 KHz in case of Standards ISO 1443 and ISO 15693.

When circuit 25, which is also referred to as a retromodulation circuit, increases the load of transponder 2 on the oscillating circuit of reader 1, the oscillating circuit of transponder 2 is subjected to additional damping compared with the load constituted by the other circuits and this causes transponder 2 to sample a larger amount of the energy of the high-frequency field. On the reader 1 side, this change in energy results in variation of the current in antenna L1 assuming amplifier 13 keeps the amplitude of the high-frequency driver signal constant or maintains it between two fixed states by amplitude modulation.

In a card-reader communication system in which the transponder is a contactless card, the field can be broken down into two components which are attributable to reader 1 and transponder 2 respectively. It is possible to distinguish a field which is referred to arbitrarily as the "primary" field produced by the winding of antenna L1 of reader 1 and a field which is referred to arbitrarily as the "secondary" field produced by the winding of antenna L2 of the card. The primary field is then modulated during communication in the reader-to-card direction. The secondary field is modulated during retromodulation (card transmits to reader).

The primary field produced by the reader and applied to the card can, in systems which involve short distances, be regarded as substantially homogeneous over the entire winding of the card. In contrast, the secondary field cannot be regarded as homogeneous in the vicinity of the card.

Figure 3:
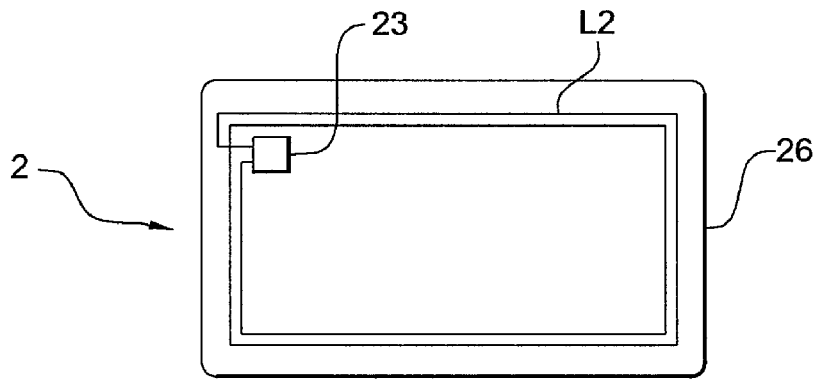
FIG. 3 is a schematic top view of a contactless card according to the prior art.

FIG. 3 shows a highly schematic top view of the contactless card. The contactless card usually has the same format as a smart card and comprises a medium 26, made of plastic for instance, on or in which integrated circuit 23 is embedded. The ends of antenna L2, formed by one or more turns of a flat conductor, a rectangular conductor for example, are connected to integrated circuit 23.

Figure 4:
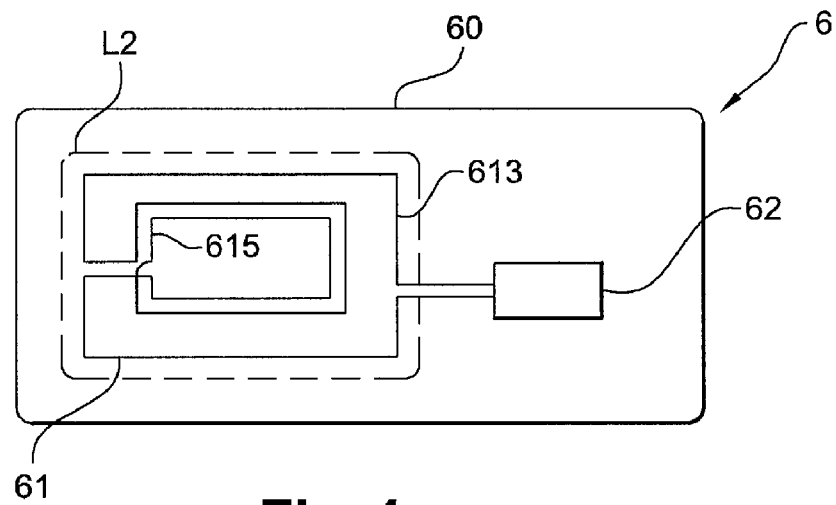
FIG. 4 is a schematic top view of a device according to the invention.

FIG. 4 is a highly schematic top view of a device 60 according to a first embodiment of the invention, for example a contactless reader fitted in a mobile phone or a digital personal assistant.

Device 60 formed, for example, on a printed circuit wafer, comprises an antenna 61 consisting of a single conductor shaped as first loop 613 and second loop 615 nested inside first loop 613 with loops 613 and 615 having opposite flow directions.

Device 60 also comprises an integrated circuit 62 connected to the terminals of antenna 61 which is in charge of transmission and reception of data by antenna 61 as explained below in greater detail.

The surface areas of loops 613 and 615 are preferably substantially equal so that, when antenna 61 is exposed to a homogeneous magnetic field, the electromotive forces induced in loops 613 and 615 cancel each other out. The sensitivity of antenna 61 to a homogeneous magnetic field is thus minimized.

Also, the dimensions of antenna 61 are preferably chosen so that said antenna is capable of fitting inside the average loop of antenna L2 of the card without any contact 2 designed to communicate with device 60. Thus, by locating antenna 61 parallel to the plane of antenna L2 of card 2, as shown in FIG. 4, peripheral loop 613 is closer to antenna L2 than central loop 615. The electromotive force induced in peripheral loop 613 by card 2 is therefore larger than the electromotive force induced in central loop 615, thus preventing the two electromotive forces from cancelling each other out. What is more, the electromotive forces induced in loops 613 and 615 by a homogeneous magnetic field continue to cancel each other out because of their substantially equal surface area.

Alternatively, several sub-loops comprising one and/or other loops are possible, as long as their flow directions are opposite.

In particular, the antenna of the device according to the invention preferably comprises a large peripheral loop in which several central sub-loops which turn in an opposite direction are nested, the surface areas of the sub-loops being substantially equal and the sum of these surface areas being substantially equal to the surface area of the large peripheral loop. Using several sub-loops actually makes it possible to improve coupling with the contactless card insofar as using several sub-loops having small surface areas centered in the large loop causes less subtraction of the card-related signal component.

It is known that there are several types of modulation in Standard ISO 14443, Standard ISO 15693 and Standard ISO 18000-X. More especially, a distinction is made between type B modulation where the modulation index is low, generally of the order of 10%, and type A modulation where the modulation index equals 100%. If a contactless device, reader or card uses type A modulation, it is referred to as a "type A" reader or card and if it uses type B modulation it is referred to as a "type B" reader or card.

Various embodiments of integrated circuit 62 depending on the particular type of contactless reader and card with which the device according to the invention operates are described below.

Figure 5:
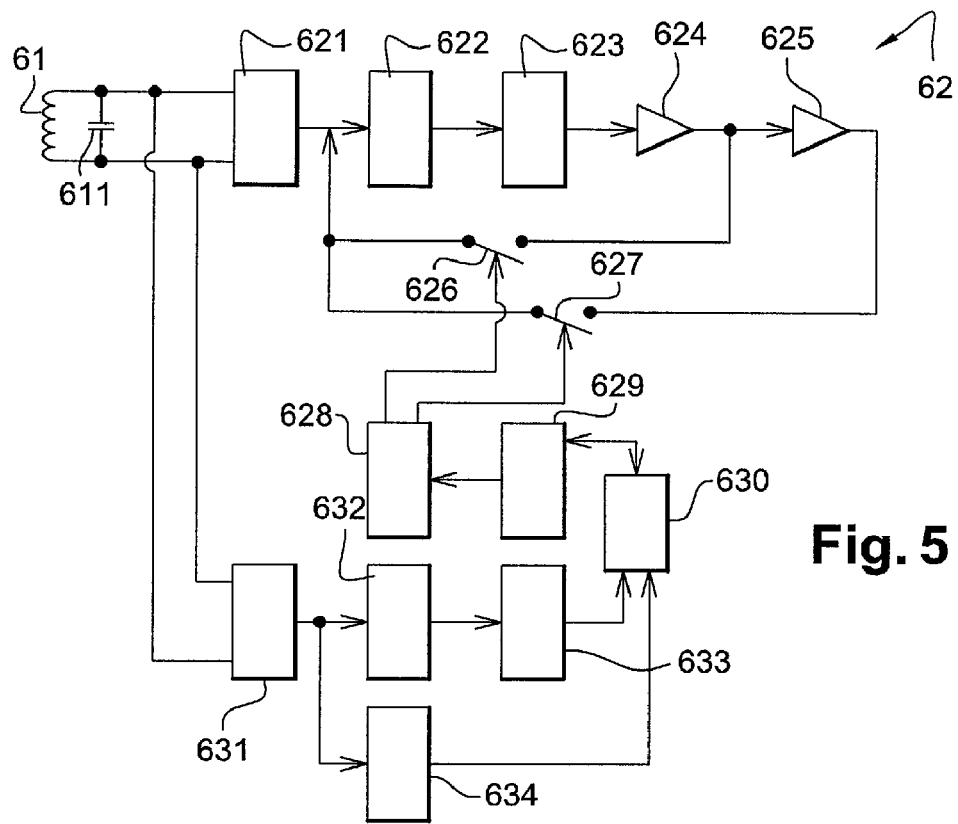
FIG. 5 is a schematic view of a first embodiment of the communications circuit which is part of the device shown in FIG. 4.

FIG. 5 is a schematic view of a first embodiment of integrated circuit 62 which is especially suitable if the contactless reader and card are both type B devices.

In order to interrogate the contactless card, circuit 62 comprises a rectifier 621 connected to the terminals of antenna 61 which, together with a capacitor 611 connected across its terminals, forms an oscillating circuit which is, in itself, known.

An envelope detector 622, such as an RC type low-pass filter, is also connected to the output of rectifier 621 and thus supplies the envelope of the signal on the antenna terminals; this makes it possible to detect the signal's carrier modulation.

Circuit 62 also comprises an averager circuit 623, for example in the form of an RC filter having a cut-off frequency lower than that of detector 622, as well as two multipliers 624, 625, which multiply by a predetermined gain G, for example a gain equal to 0.92. Multipliers 624, 625 are connected in series to the output of averager circuit 623 and define a high voltage level and a low voltage level respectively, these levels being used during modulation when the device controls a contactless card.

To achieve this, the outputs of multipliers 624 and 625 are connected to the output of rectifier 621, for example a Graetz bridge (diode bridge), via controllable switches 626, 627 respectively. Thus, by closing switch 626 and leaving switch 627 open, a high voltage level is set on the terminals of antenna 61. Similarly, by closing switch 627 and leaving switch 626 open, a low voltage level is set on the terminals of antenna 61.

The output signal of the first multiplier 624 therefore provides a high-level reference signal which is modulated by means of the second multiplier and controllable switches 626, 627.

Circuit 62 also comprises a carrier modulator 628 which controls switches 626, 627 in order to send commands to the card. Modulator 628 receives modulation instructions from a first data processing module 629 which is controlled by a sequencer 630 in a manner which is, in itself, known.

In order to receive data from the contactless card, circuit 62 comprises a differential amplifier 631 which is connected to the terminals of antenna 61 and therefore samples the modulated signal on the antenna terminals. A correlation demodulator 632 which is connected to amplifier 631 determines the data contained in the subcarrier modulation produced by retromodulation by the contactless card. To achieve this, switches 626 and 627 are open when the device according to the invention is listening to the card.

Circuit 62 also comprises a second module 633 which performs appropriate processing on data received from the contactless card; the second processing module 633 is controlled by sequencer 630 in a manner which is, in itself, known.

Finally, circuit 62 comprises, connected to the output of differential amplifier 631, a clock recovery module 634 used to recover the clock obtained from the carrier of the fixed reader; the recovered clock sequences the digital sections of circuit 62 in a manner which is, in itself known. Note that the antenna of the device according to the invention substantially sees only the field of the card. Because the card sees the field of the reader, as does the device according to the invention, this therefore makes it possible to recover the clock of the carrier transmitted by the reader.

Figure 6:
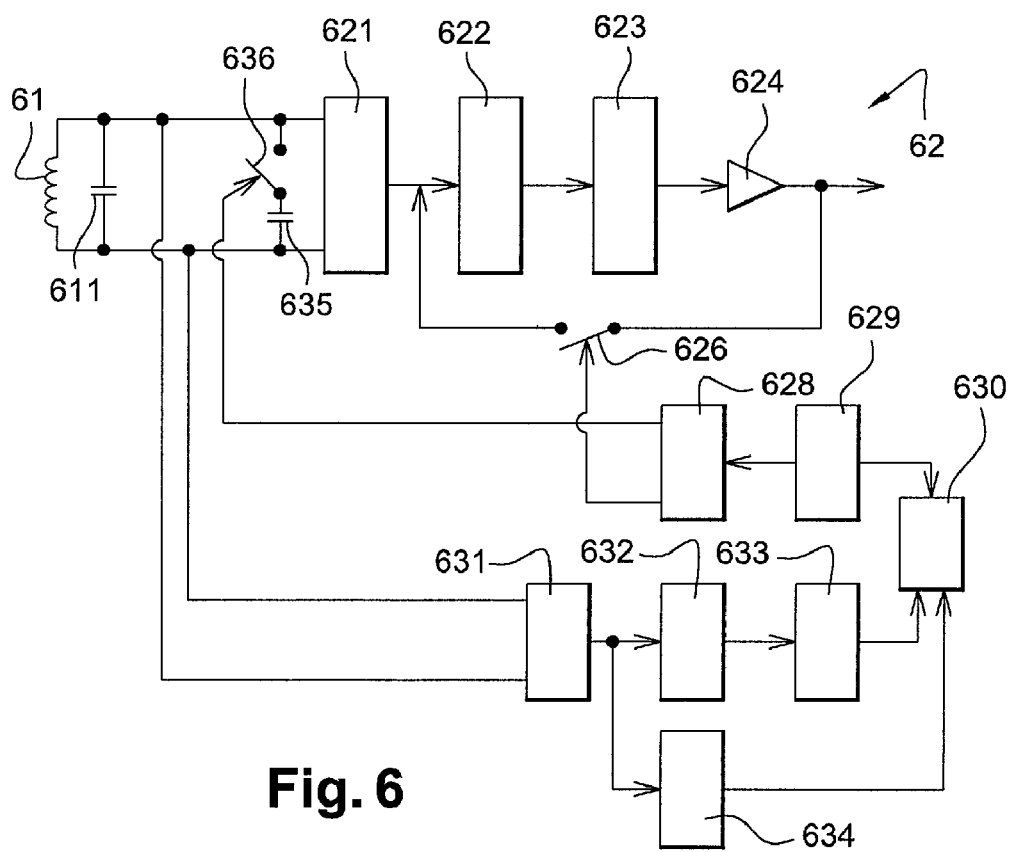
FIG. 6 is a schematic view of a second embodiment of the communications circuit which is part of the device shown in FIG. 4.

FIG. 6 schematically shows a second embodiment of circuit 62 which is especially suitable if the contactless reader is type B and the contactless card is type A.

In order to interrogate the contactless card, the second embodiment differs from that described in relation to FIG. 5 in that, instead of second multiplier 625 and associated second switch 627, a second capacitor 635 is connected to the terminals of antenna 61 via switch 636 in order to vary the antenna tuning, thereby producing type A carrier amplitude modulation.

The output signal of multiplier 624 therefore provides a high-level reference signal which is modulated by means of the second capacitor 635 and controllable switches 626, 636.

Figure 7:
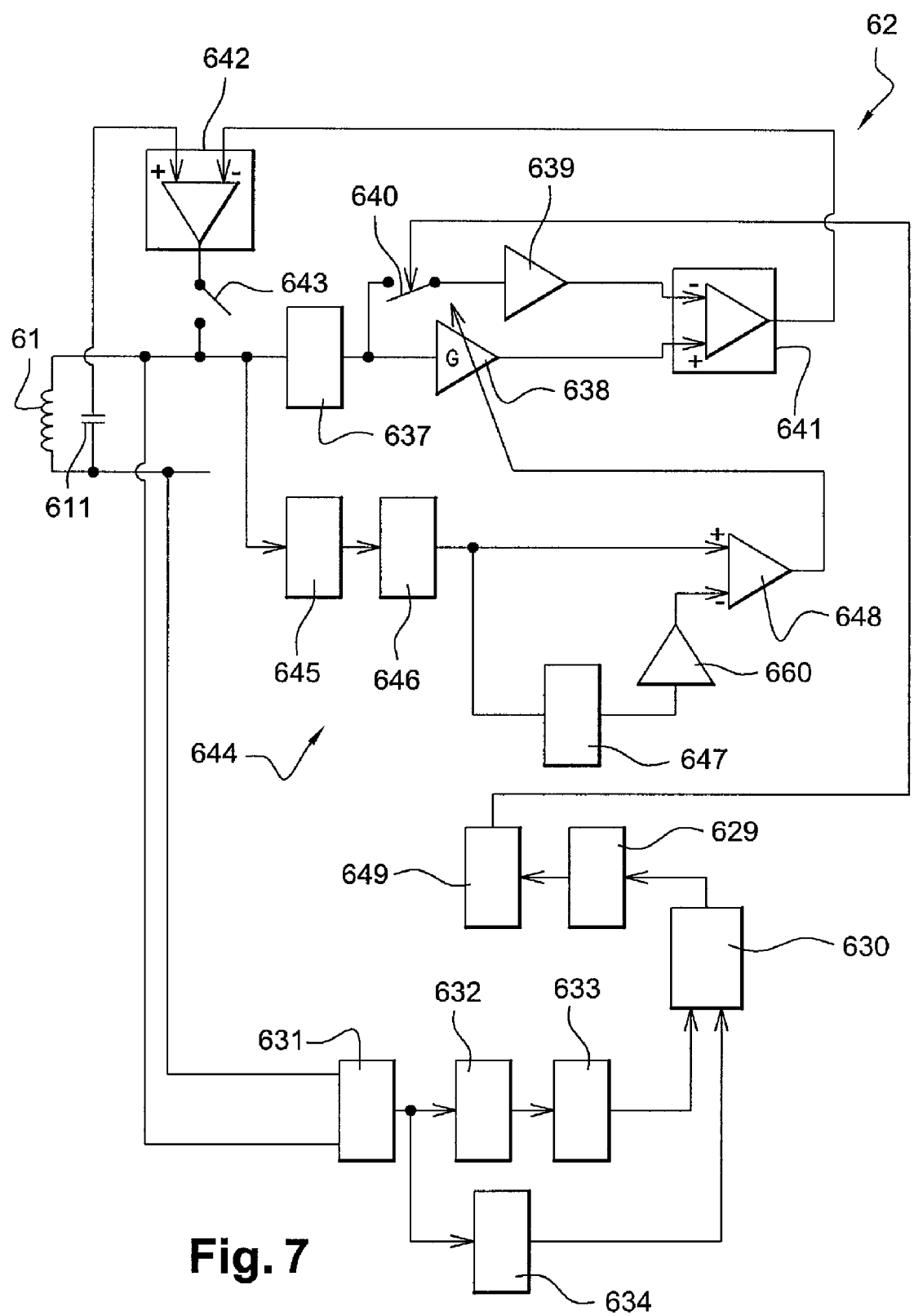
FIG. 7 is a schematic view of a third embodiment of the communications circuit which is part of the device shown in FIG. 4.

FIG. 7 schematically shows a third embodiment of circuit 62 which is especially suitable if the contactless reader is type A, regardless of contactless-card type.

In this third embodiment, in order to interrogate the contactless card, circuit 62 comprises an oscillator 637 which generates a sine-wave signal having a frequency substantially equal to that of the carrier of the fixed reader and synchronized with the carrier, for example by means of a phase-locked loop (not shown).

A first variable-gain multiplier 638 and a second multiplier 639 are connected in series to oscillator 637; the second multiplier 639 is connected via a first switch 640. The outputs of the first and second multipliers 638, 639 are also connected respectively to the non-inverting and inverting terminals of a first subtracter 641.

Adder 642 is connected, via its inverting terminal, to the output of the first subtracter 641. The output of second subtracter 642 is connected, via a second switch 643, by its non-inverting terminal to the terminal of antenna 61 to which oscillator 637 is connected in order to control the electromotive force of antenna 61 by applying the sum of the antenna signal, the modulation gaps in this signal being filled by the signal produced on the output of subtracter 641.

A gain adjustment module 644 to adjust the gain of first multiplier 638 comprises a rectifier 645 connected to antenna 61, an envelope detector 646 connected to the output of rectifier 645, an averager circuit 647 connected to the output of detector 646, a second multiplier 660, which multiplies by a gain of less than 1, for example a gain of 0.5, and a third subtracter 648, the non-inverting and inverting terminals of which are connected respectively to the outputs of detector 646 and averager circuit 647. The output of the third subtracter 648 is connected to first multiplier 638 and adjusts the latter's gain.

It is apparent that module 644 automatically detects gaps in the signal on the antenna terminals and applies a non-zero gain during the corresponding time intervals and zero gain at other times. Adding the signal on the output of subtracter 641 and the signal on the antenna terminals thus produces a carrier modulation.

Circuit 62 also comprises a carrier modulator 649 which controls first switch 640 and receives modulation instructions from a first data processing module 629 which is controlled by a sequencer 630 in a manner which is, in itself, known.

The output signal of the first variable-gain multiplier 638 therefore provides a high-level reference signal which is modulated by means of switch 640, multiplier 639 and subtracter 641.

In order to receive data from the contactless card, circuit 62 comprises a differential amplifier 631, a correlation demodulator 632, a second data processing module 633 and a clock recovery module 634 used to recover the clock from the carrier of the fixed reader; these components are similar to those in the embodiments shown in FIGS. 5 and 6.

A device according to the invention equipped with such a circuit 62 can therefore operate if the contactless reader is a type A reader according to Standard ISO 14443 and uses a very high modulation index, such as 100% for example, in order to send commands. With this type of modulation with a 100% modulation index, there are periods during which the reader sends no signal. In fact, during such periods, neither the contactless card or the device according to the invention are remotely powered. In addition, because the reader does not send a signal, there is therefore no basis which can be used in order to establish communication between the device according to the invention and the contactless card.

In order to overcome this problem, circuit 62 described in relation to FIG. 7 recreates the signal during periods when the reader is silent. Second switch 643 is thus closed during the card's command phases. An adjustable gain is then applied to the signal produced by oscillator 637 and the signal, thus amplified, is subtracted from the antenna signal sampled by subtracter 642. When first switch 640 is open, the resulting signal has a constant amplitude and gaps in the reader's signal are filled regardless of their duration and amplitude.

Adjustment of the gain of first multiplier 638 is obtained by monitoring variations in the envelope of the signals on the antenna terminals thanks to gain adjustment module 644. This module 644 actually determines the variations in this envelope relative to its mean and the signal generated on the output of second subtracter 642 tends towards this mean.

Modulation of the control signal for the contactless card is also obtained by opening and closing first switch 640. Closing this switch actually causes a drop in the amplitude of the signal on the terminals of antenna 71 and this corresponds to the low modulation level.

Finally, during phases when listening to the contactless card, second switch 643 is opened in order not to interfere with the signal on the terminals of antenna 71.

Obviously, other embodiments are possible. More especially, the reference signal obtained subsequent to sampling and processing the signal on the antenna terminals can be a current, for example.

The invention claimed is:

1. A radio-frequency communication device comprising:
an inductive antenna comprising a first winding and a second winding such that when in the presence of (i) a primary magnetic field, which is substantially homogeneous on the scale of the antenna, and (ii) a secondary magnetic field produced by a transponder located in the vicinity of the antenna, the secondary magnetic field induces a relatively larger electromotive force in the first winding than in the second winding preventing a cancellation of the relatively larger electromotive force while the primary magnetic field continues to induce mutually cancelling electromotive forces in the first winding and the second winding; and
a transponder interrogation circuit comprising:
sampling and processing means for sampling and processing a signal on antenna terminals to produce a reference signal as a function of said signal;
modulation means for modulating the reference signal to create a modulated signal; and
application means for applying the modulated signal to the antenna terminals.

2. A radio-frequency communication device as claimed in claim 1, wherein the first winding and the second winding are connected in series and wound in opposite directions.

3. A radio-frequency communication device as claimed in claim 2, wherein a surface area of the second winding is substantially equal to a surface area of first winding.

4. A radio-frequency communication device as claimed in claim 3, wherein the second winding comprises a plurality of loops, a surface area of each of which is a submultiple of the surface area of the first winding.

5. A radio-frequency communication device as claimed in claim 2, wherein the first winding defines a surface area inside which the second winding is nested.

6. A radio-frequency communication device as claimed in claim 1, wherein the sampling and processing means comprise rectifying and averaging means for rectifying and averaging the signal on the antenna terminals.

7. A radio-frequency communication device as claimed in claim 6, wherein rectifying and averaging means comprise a rectifier connected to the antenna terminals, an envelope detector connected to an output of the rectifier and an averager circuit connected to an output of the envelope detector.

8. A radio-frequency communication device as claimed in claim 6, wherein the sampling and processing means comprise a first multiplier, which multiplies by a first predetermined gain which is less than 1, connected to an output of the rectifying and averaging means.

9. A radio-frequency communication device as claimed in claim 6, wherein the modulation means comprise a second multiplier, which multiplies by a second predetermined gain, connected to the output of sampling and processing means, a first control switch located between sampling and processing means and the antenna and a second controllable switch located between the second multiplier and the antenna.

10. A radio-frequency communication device as claimed in claim 6, wherein the modulation comprise a first controllable switch located between the sampling and processing means and the antenna and a capacitor capable of being connected in parallel with the antenna by means of a second controllable switch.

11. A radio-frequency communication device as claimed in claim 1, wherein sampling and processing means comprise filling means for producing a signal to fill gaps in the signal sampled on the antenna terminals.

12. A radio-frequency communication device as claimed in claim 11, wherein the filling means comprise an oscillator which is connected to the antenna and capable of generating a sine-wave signal having a frequency substantially equal to that of a carrier received on the antenna and synchronized with the latter, a first multiplier, which multiplies by a variable gain, being connected to an output of the oscillator and a control circuit for controlling the gain of the first multiplier capable of adjusting this gain to a value which is not zero when there is a gap in the signal sampled on the antenna terminals.

13. A radio-frequency communication device as claimed in claim 12, wherein the control circuit comprises a rectifier connected to the antenna, an envelope detector connected to the output of rectifier, and an averager circuit connected to an output of the rectifier and a subtracter, a non-inverting terminal of which is connected to an output of the detector, an inverting terminal of which is connected to an output of averager circuit and the output of which is connected to the first multiplier in order to control the latter's gain.

14. A radio-frequency communication device as claimed in any of claim 11, wherein the modulation means are capable of modulating the signal to fill gaps to create a modulated gap filling signal, and the application means are capable of applying a sum of the signal sampled on the antenna terminals and the modulated gap filling signal to the antenna terminals.

15. A radio-frequency communication system comprising a radio-frequency emission source using a carrier, a transponder and a radio-frequency communication device according to claim 1.

16. A method for transmitting a command from a radio-frequency communication device designed to communicate with a transponder, said device being in conformity with claim 1, the method consisting of:
placing the transponder and the device in a primary magnetic field which is substantially homogeneous on the scale of the device's antenna;
placing the device close to the transponder so as to establish strong inductive coupling between the device and the transponder; and
activating the sampling and processing means, the modulation means and the application means of the device when the device sends a command to the transponder.

17. A radio-frequency communication device comprising:
an inductive antenna comprising a first winding and a second winding which are connected in series and wound in opposite directions, the surface area of second winding is substantially equal to the surface area of first winding, the second winding comprises a plurality of loops, the surface area of each of which is a submultiple of the surface area of the first winding, and the first winding defines a surface area inside which second winding is nested; and
a transponder interrogation circuit comprising:
means of sampling and processing the signal on the antenna terminals which are capable of producing a reference signal as a function of said signal;
modulation means capable of modulating the reference signal; and
application means capable of applying the modulated signal to the antenna terminals.

18. A method according to claim 16, said method further comprising the step of providing the transponder with an average loop antenna inside which the first winding of the device is capable of being fitted.

* * * * *